United States Patent
Shi et al.

(10) Patent No.: US 11,507,829 B2
(45) Date of Patent: Nov. 22, 2022

(54) GREEDY APPROACH FOR OBTAINING AN ARTIFICIAL INTELLIGENCE MODEL IN A PARALLEL CONFIGURATION

(71) Applicant: Gyrfalcon Technology Inc., Milpitas, CA (US)

(72) Inventors: Yinbo Shi, Santa Clara, CA (US); Yequn Zhang, San Jose, CA (US); Xiaochun Li, San Ramon, CA (US); Bowei Liu, Fremont, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 449 days.

(21) Appl. No.: 16/702,365

(22) Filed: Dec. 3, 2019

(65) Prior Publication Data
US 2020/0234118 A1    Jul. 23, 2020

Related U.S. Application Data

(60) Provisional application No. 62/793,835, filed on Jan. 17, 2019.

(51) Int. Cl.
*G06N 3/08* (2006.01)
*G06N 3/063* (2006.01)
*G06N 3/04* (2006.01)
*G06N 20/00* (2019.01)

(52) U.S. Cl.
CPC .......... *G06N 3/08* (2013.01); *G06N 3/04* (2013.01); *G06N 3/063* (2013.01); *G06N 20/00* (2019.01)

(58) Field of Classification Search
CPC .......... G06N 3/08; G06N 20/00; G06N 3/04; G06N 3/063; G06N 3/0454; G06N 3/02
USPC .............. 707/601, 602, 999.107; 706/52, 25
See application file for complete search history.

(56) References Cited

U.S. PATENT DOCUMENTS

| | | | | |
|---|---|---|---|---|
| 11,170,293 | B2* | 11/2021 | Gao | G06N 3/0445 |
| 2019/0042884 | A1* | 2/2019 | Guim Bernat | G06N 3/08 |
| 2019/0138934 | A1* | 5/2019 | Prakash | G06N 3/08 |
| 2020/0133898 | A1* | 4/2020 | Therene | G06N 3/0454 |
| 2022/0188700 | A1* | 6/2022 | Khavronin | G06N 20/00 |

OTHER PUBLICATIONS

Baldassi, et al., "Unreasonable effectiveness of learning neural networks: From accessible states and robust ensembles to basic algorithmic schemes", PNAS, Nov. 15, 2016, pp. E7655-E7662.

* cited by examiner

*Primary Examiner* — Evan Aspinwall
(74) *Attorney, Agent, or Firm* — Wolf, Greenfield & Sacks, P.C.

(57) ABSTRACT

A system may include multiple client devices and a processing device communicatively coupled to the client devices. One or more client devices may implement a greedy approach in searching for an optimal artificial intelligence (AI) model. For example, a client device may use a training dataset to perform an AI task, and update its AI model. The client device may verify the performance of the AI task and determine whether to accept or reject its updated AI model. Upon rejection, the client device may repeat updating its AI model until the updated AI model is accepted, or until a stopping criteria is met. The processing device may be configured to update the initial AI models based on the accepted updated AI models obtained in the multiple client device. Training data for each of the client devices may contain a subset shuffled from a larger training dataset.

24 Claims, 9 Drawing Sheets

GREEDY APPROACH FOR OBTAINING AN ARTIFICIAL INTELLIGENCE MODEL IN A PARALLEL CONFIGURATION

CROSS-REFERENCE TO RELATED APPLICATION

This application claims the filing benefit of U.S. Provisional Application No. 62/793,835, filed Jan. 17, 2019. This application is incorporated by reference herein in its entirety and for all purposes.

FIELD

This patent document relates generally to systems and methods for providing artificial intelligence solutions. Examples of determining an artificial intelligence model in a parallel configuration for loading into one or more artificial intelligence chips for performing artificial intelligence tasks are provided.

BACKGROUND

Artificial intelligence solutions are emerging with the advancement of computing platforms and integrated circuit solutions. For example, an artificial intelligence (AI) integrated circuit (IC) may include a processor capable of performing AI tasks in embedded hardware. Hardware-based solutions, as well as software solutions, still encounter the challenges of obtaining an optimal AI model, such as a convolutional neural network (CNN). A CNN may include multiple convolutional layers, and a convolutional layer may include multiple weights. Given the increasing size of the CNN that can be embedded in an IC, a CNN may include hundreds of layers and may include millions of weights. For example, the weights for an embedded CNN inside an AI chip may take as large as a few megabytes of data. This makes it difficult to obtain an optimal CNN model because a large amount of computing time is needed.

BRIEF DESCRIPTION OF THE DRAWINGS

The present solution will be described with reference to the following figures, in which like numerals represent like items throughout the figures.

DETAILED DESCRIPTION

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Each of the terms "artificial intelligence logic circuit" and "AI logic circuit" refers to a logic circuit that is configured to execute certain AI functions such as a neural network in AI or machine learning tasks. An AI logic circuit can be a processor. An AI logic circuit can also be a logic circuit that is controlled by an external processor and executes certain AI functions.

Each of the terms "integrated circuit" "semiconductor chip," "chip," and "semiconductor device" refers to an integrated circuit (IC) that contains electronic circuits on semiconductor materials, such as silicon, for performing certain functions. For example, an integrated circuit can be a microprocessor, a memory, a programmable array logic (PAL) device, an application-specific integrated circuit (ASIC), or others. An integrated circuit that contains an AI logic circuit is referred to as an AI integrated circuit.

The term "AI chip" refers to a hardware- or software-based device that is capable of performing functions of an AI logic circuit. An AI chip can be a physical IC. For example, a physical AI chip may include an embedded cellular neural network (CeNN), which may contain weights and/or parameters of a CNN. The AI chip may also be a virtual chip, i.e., software-based. For example, a virtual AI chip may include one or more processor simulators to implement functions of a desired AI logic circuit.

The term of "AI model" refers to data that include one or more parameters that, when loaded inside an AI chip, are used for executing the AI chip. For example, an AI model for a given CNN may include the weights, biases, and other parameters for one or more convolutional layers of the CNN. Here, the weights and parameters of an AI model are interchangeable.

Figure 1:
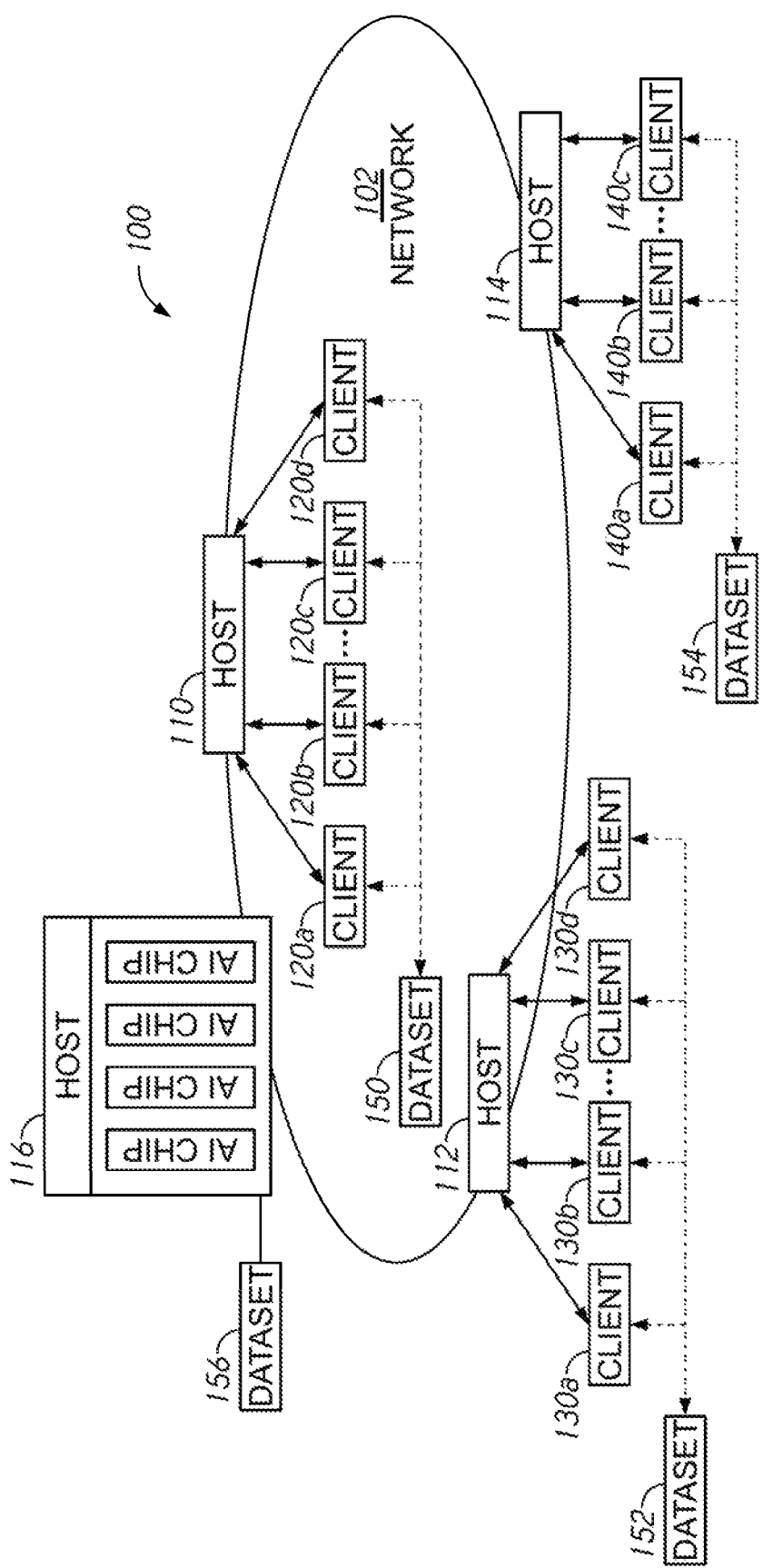
FIG. 1 illustrates an example system in accordance with various examples described herein.

FIG. 1 illustrates an example system in accordance with various examples described herein. In some examples, a communication system 100 includes a communication network 102. Communication network 102 may include any suitable communication links, such as wired (e.g., serial, parallel, optical, or Ethernet connections) or wireless (e.g., Wi-Fi, Bluetooth, or mesh network connections), or any suitable communication protocols now or later developed. In some scenarios, system 100 may include one or more host, devices, e.g., 110, 112, 114, 116. A host device may communicate with another host device or other devices on the network 102. A host device may also communicate with one or more client devices via the communication network 102. For example, host device 110 may communicate with client devices 120a, 120b, 120c, 120d, etc. Host device 112 may communicate with client devices 130a, 130b, 130c, 130d, etc. Host device 114 may communicate with client devices 140a, 140b, 140c, etc. A host device, or any client device that communicates with the host device, may have access to one or more datasets used for obtaining an AI model. For example, host device 110 or a client device such as 120a, 120b, 120c, or 120d may have access to dataset 150.

In FIG. 1, a client device may include a processing device. A client device may also include one or more AI chips. In some examples, a client device may be an AI chip. The AI chip may be a physical AI IC. The AI chip may also be software-based, such as a virtual AI chip that includes one or more process simulators to simulate the operations of a physical AI IC. A processing device may include an AI chip and contain programming instructions that will cause the AI chip to be executed in the processing device. Alternatively, and/or additionally, a processing device may also include a virtual AI chip, and the processing device may contain programming instructions configured to control the virtual AI chip so that the virtual AI chip may perform certain AI functions. In FIG. 1, each client device, e.g., 120a, 1241, 120c, 120d may be in electrical communication with other client devices on the same host device, e.g., 110, or client devices on other host devices.

In some examples, the communication system 100 may be a centralized system. System 100 may also be a distributed or decentralized system, such as a peer-to-peer (P2P) system. For example, a host device, e.g., 110, 112, 114, and 116, may be a node in a P2P system. In a non-limiting example, a client devices, e.g., 120a, 120b, 120c, and 120d may include a processor and an AI physical chip. In another non-limiting example, multiple AI chips may be installed in a host device. For example, host device 116 may have multiple AI chips installed on one or more PCI boards in the host device or in a USB cradle that may communicate with the host device. Host device 116 may have access to dataset 156 and may communicate with one or more AI chips via PCI board(s), internal data buses, or other communication protocols such as universal serial bus (USB).

In some scenarios, the AI chip may contain an AI model for performing certain AI tasks. Examples of an AI task may include image recognition, voice recognition, object recognition, data processing and analyzing, or any recognition, classification, processing tasks that employ artificial intelligence technologies. In some examples, an AI model may include a forward propagation neural network, in which information may flow from the input layer to one or more hidden layers of the network to the output layer. For example, an AI model may include a convolutional neural network (CNN) that is trained to perform voice or image recognition tasks. A CNN may include multiple convolutional layers, each of which may include multiple parameters, such as weights and/or other parameters. In such case, an AI model may include parameters of the CNN model. In some examples, a CNN model may include weights, such as a mask and a scalar for a given layer of the CNN model. For example, a kernel in a CNN layer may be represented by a mask that has multiple values in lower precision multiplied by a scalar in higher precision. In some examples, a CNN model may include other parameters. For example, an output channel of a CNN layer may include one or more bias values, that, when added to the output of the output channel, adjust the output values to a desired range.

In a non-limiting example, in a CNN model, a computation in a given layer in the CNN may be expressed by $Y=w*X+b$, where X is input data, Y is output data, w is a kernel, and b is a bias; all variables are relative to the given layer. Both the input data and the output data may have a number of channels. Operation "*" is a convolution. Kernel w may include binary values. For example, a kernel may include 9 cells in a 3×3 mask, where each cell may have a binary value, such as "1" and "−1." In such case, a kernel may be expressed by multiple binary values in the 3×3 mask multiplied by a scalar. In other examples, for some or all kernels, each cell may be a signed 2, 3, 5, or 8 bit integer. Other bit length or values may also be possible. The scalar may include a value having a bit width, such as 12-bit or 16-bit. Other bit length may also be possible. Alternatively, and/or additionally, a kernel may contain data with non-binary values, such as 7-value. The bias b may contain a value having multiple bits, such as 18 bits. Other bit length or values may also be possible. In a non-limiting example, the output Y may be further discretized into a signed 6-bit or 11-bit integer. Other bit length or values may also be possible.

In the case of physical AI chip, the AI chip may include an embedded cellular neural network that has memory containing the multiple parameters in the CNN. In some scenarios, the memory in a physical AI chip may be a one-time-programmable (OTP) memory that allows a user to load a CNN model into the physical AI chip once. Alternatively, a physical AI chip may have a random access memory (RAM), magnetoresistive random access memory (MRAM), or other types of memory that allows a user to update and load a CNN model into the physical AI chip multiple times.

In the case of virtual AI chip, the AI chip may include a data structure that simulates the cellular neural network in a physical AI chip. In other examples, a virtual AI chip may directly execute an AI logic circuit without needing to simulate a physical AI chip. A virtual AI chip can be particularly advantageous when higher precision is needed, or when there is a need to compute layers that cannot be accommodated by a physical AI chip.

In the case of a hybrid AI chip, part of an AI logic circuit can be computed using a physical AI chip, while the remainder can be computed with a virtual chip. In a non-limiting example, the physical AI chip may implement all convolutional, MaxPool, and some of the ReLU layers, while the virtual AI chip implements other layers. This is useful because physical AI chips can greatly accelerate the computations of some convolutional layers, without needing to accommodate every possible layer.

In some examples, a host device may compute one of more layers of a CNN before sending the output to a physical AI chip. In some examples, the host device may use the output of a physical AI chip to compute output of an AI task. For example, a host device may receive the output of the convolution layers of a CNN from a physical AI chip and perform the operations of the fully connected layers.

With further reference to FIG. 1, a host device on a communication network as shown in FIG. 1 (e.g., 110) may include a processing device and contain programming instructions that, when executed, will cause the processing device to access a dataset, e.g., 150, for example, training data. The training data may be provided for use in obtaining the AI model. In doing so, the AI model may be trained depending on the application. For example, training data may be used for training an AI model that is suitable for face recognition tasks, and may contain any suitable dataset collected for performing face recognition tasks. In another example, training data may be used for training an AI model suitable for scene recognition in video and images, and may contain any suitable scene dataset collected for performing scene recognition tasks. In some scenarios, training data may reside in a memory in a host device. In one or more other scenarios, training data may reside in a central data repository and is available for access by a host device (e.g., 110, 112, 114 in FIG. 1) or a client device (e.g., 120a-d, 130*a-d*, 140*a-d* in FIG. 1) via the communication network 102. In some examples, system 100 may include multiple test sets, such as datasets 150, 152, 154. A CNN model may be obtained by using the multiple devices in a communication system such as shown in FIG. 1. Details are further described with reference to FIGS. 2-7.

Figure 2:
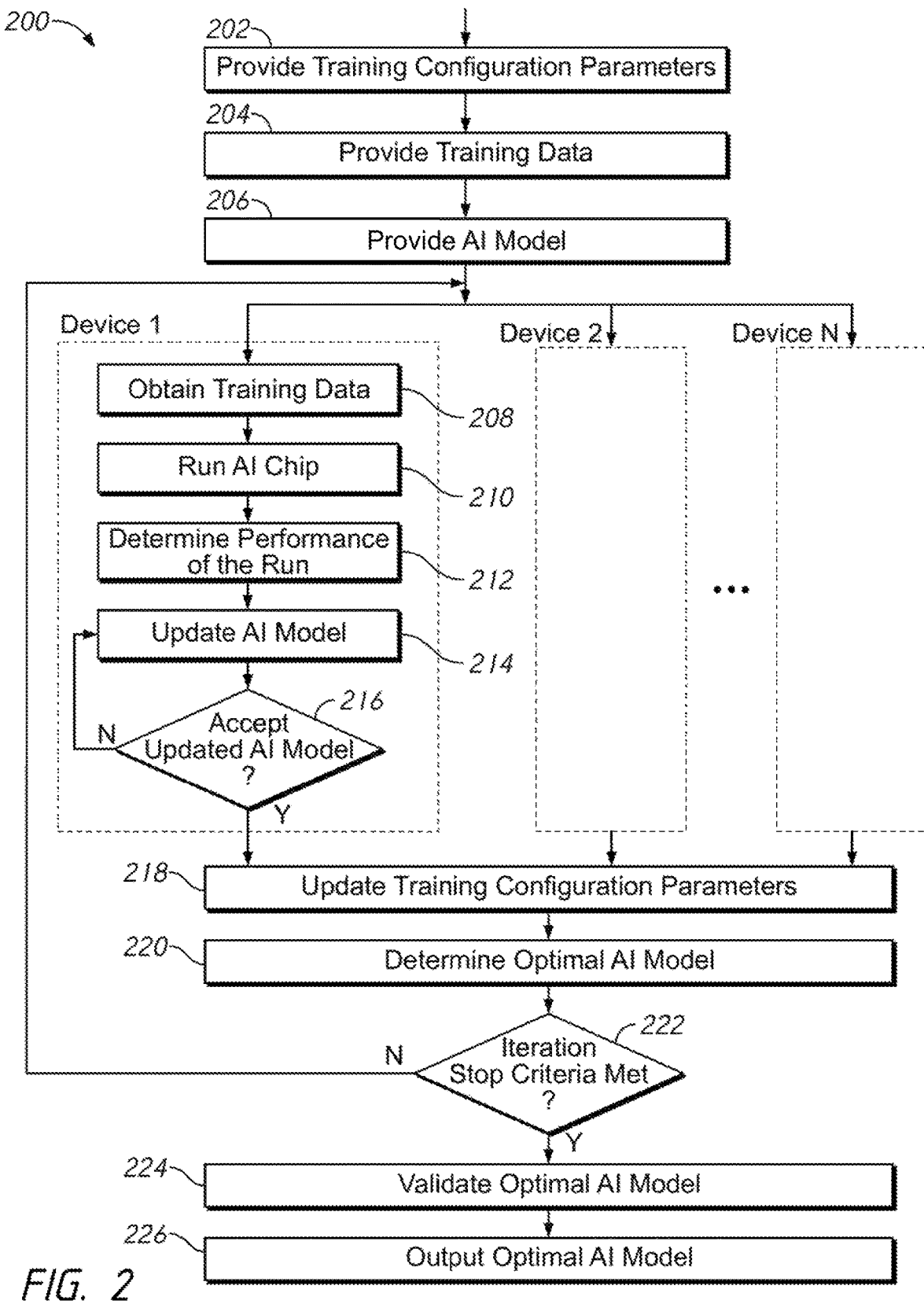
FIG. 2 illustrates a diagram of an example process of obtaining an optimal AI model in a parallel configuration in accordance with various examples described herein.

FIG. 2 illustrates a diagram of an example process of obtaining an optimal AI model in a parallel configuration in accordance with various examples described herein. A process 200 for training an AI model may be implemented in a processing device, such as a host device. The process 200 may perform various functions, in one or more devices, such as Device 1, Device 2, . . . , Device N. In some examples, the process 200 may include providing training configuration parameters at 202, providing training data at 204, and/or providing initial AI models at 206. For example, process 204 may retrieve training dataset and provide a subset data shuffled from the training dataset. These processes 202, 204, 206 prepare data and AI model that may be used by a process for each of the multiple devices Device 1, Device 2, . . . , or Device N. The process 200 may include multiple iterations, which may stop when an iteration stopping criteria is met at 222. During each iteration, a new training process may be started for each of the multiple devices. Each of the multiple devices may include an AI chip for running an AI task with an AI model inside the AI chip. Each of the multiple devices may upload an AI model to the AI chip in the device. A device may also be capable of updating the AI model. In a training process, training data for each of the multiple devices may contain a subset data shuffled from a larger training dataset.

In some examples, a process that may be in one of the multiple devices, such as Device 1, may include obtaining training data at 208, running the AI chip in the device at 210, determining a performance value of the run at 212, where the performance value may be indicative of the performance of the AI model used in the run. Running an AI chip may include executing a physical AI chip. For example, the AI chip may include a CeNN, in which case, running the AI chip may include performing an AI task (e.g., recognition task) using the parameters (including weights) of the CeNN. Similarly, running an AI chip may include executing a virtual chip. For example, the virtual AI chip may include a CNN, in which case, running the AI chip may include performing one or more convolutions using the weights and parameters of the CNN. The process for each device may further include updating the AI model at 214 and determining whether to accept the updated AI model at 216. The process 200 may repeat updating the AI model at 214, until the updated AI model is accepted at 216. Upon acceptance of the updated AI model, the process for each of the multiple devices may output the respective updated AI model of the device. The process 200 may further update training configuration parameters at 218, and determine an optimal AI model from among the multiple devices at 220, and repeat the training process for the multiple devices until the iteration stopping criteria is met at 222. Examples of boxes 208-216 are further described in detail in FIG. 4A.

When the stopping criteria is met, the process 200 may validate the optimal AI models at 224 and obtain an optimal AI model at 226. In each iteration before the stopping criteria is met at 222, processes 208-216 may be implemented in any of the devices, such as Device 1, Device 2, etc. As shown in FIG. 2, multiple devices (e.g., AI chips) may run multiple training processes in parallel, each of which produces a respective updated AI model, where the training data for each device may be shuffled in variable ways, to be explained further. The training processes for multiple devices may be performed in parallel, and moderated based on the behaviors of the other devices. For example, the training process for each device may be based on a different training dataset (e.g., non-overlapping or overlapping) depending on how the training datasets are shuffled. The training process for the multiple devices may also be based on the updated training configuration parameters, which may determine how the acceptance is determined (e.g., at 216). The acceptance criteria may also be determined, at least in part, based on the performance values of the current and updated AI models. In some examples, the acceptance criteria may be determined, at least in part, based on the average parameters, (e.g., weights) of AI models in one or more of die multiple devices.

Figure 3:
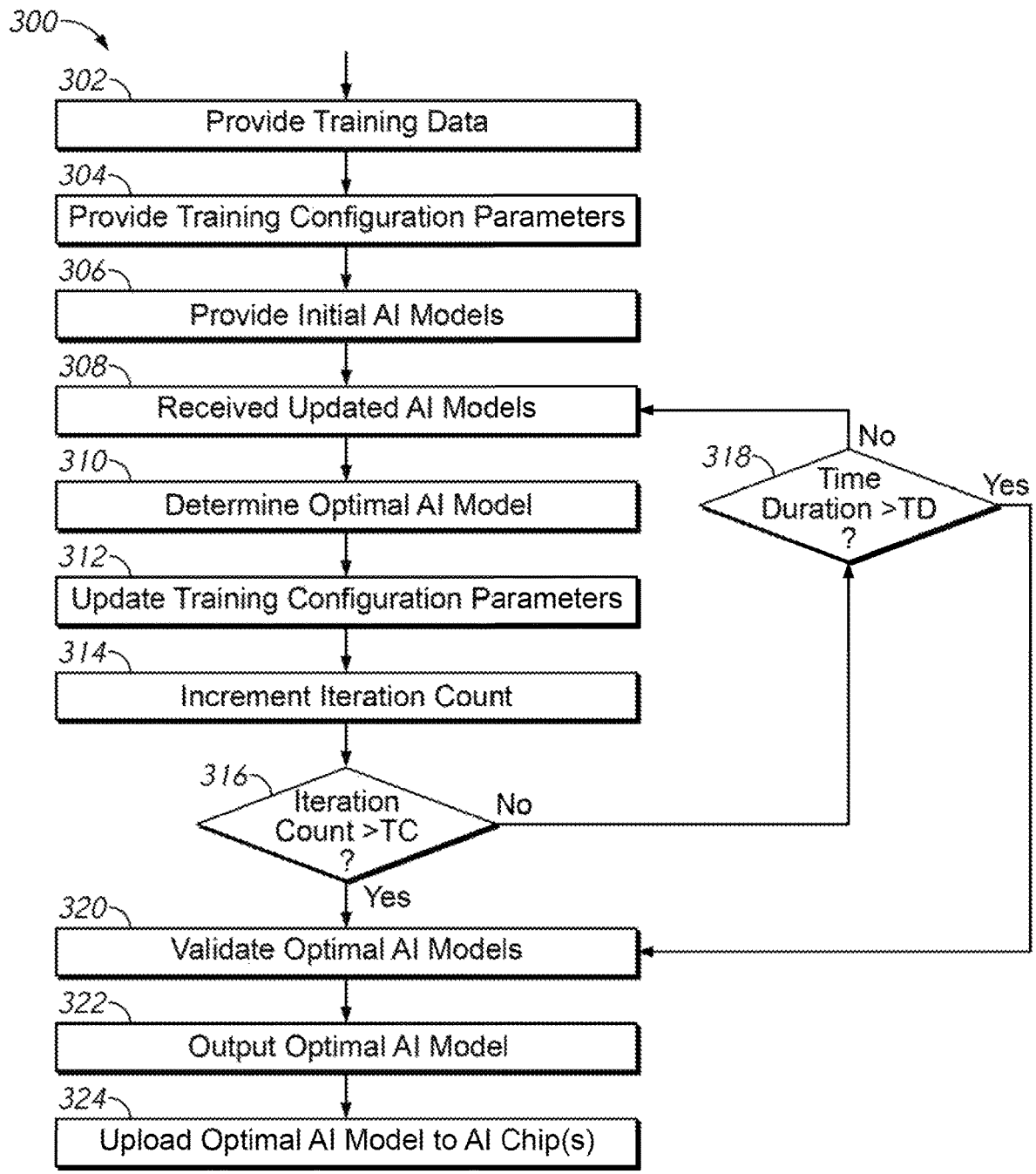
FIG. 3 illustrates a diagram of an example process of obtaining an optimal AI model that may be implemented in a host device in a parallel configuration in accordance with various examples described herein.

Various boxes in FIG. 2 may be implemented in either a host device or a client device, or a combination thereof. Without limiting the scope of the disclosure, FIG. 3 illustrates a diagram of an example process of obtaining an optimal AI model that may be implemented in a host device in a parallel configuration in accordance with various examples described herein. In some examples, a host device (such as 110 in FIG. 1) may be configured to implement one or more training processes for one or more client devices (e.g., one or more AI chips) to which the host device is communicating (e.g., 120*a*, 120*b*, 120*c*, 120*d* under host device 110, or one or more AI chips under host device 116) to cause each of the multiple client devices to determine a respective AI model. In a parallel configuration, such as shown in FIG. 2, the multiple devices (e.g., Device 1, Device 2, . . . , Device N) may be configured to each determine an AI model in parallel. While a training process in the parallel configuration may include one or more iterations, at each iteration, the AI models updated from multiple devices may be communicated to the host device. The host device may receive the AI models and associated performance values from the multiple devices and assess the performance values among the multiple devices. The host device may determine an optimal AI model based on the performance values of the multiple devices. The host device may also update the training configuration parameters for the next iteration. The host device may transmit the updated training configuration parameters and the optimal AI model at the current iteration back to each of the multiple devices to be used in the next iteration. In the next iteration, the host device may continue receiving the updated AI models from the multiple devices, where the updated AI models are generated in the multiple devices based on the updated training configuration parameters and the optimal AI model obtained from the previous iteration. The host device may repeat the iterations until a stopping criteria is met.

In FIG. 3, in some examples, a process 300 may be implemented in a host device (e.g., 110, 112, 114 in FIG. 1). The process 300 may implement one or more functions in FIG. 2 in a host device, whereas one or more other functions in FIG. 2 can be implemented in FIG. 4A in a client device. For example, the process 300 may provide training data at 302. The process 300 may also include providing training configuration parameters at 304. The process 300 may also include providing initial AI models at 306 to the client devices. In some examples, the initial AI models may include multiple initial AI models, each for a respective client device or an AI chip (under the host device). The initial AI models may be identical, or different among different client devices (e.g., AI chips). Once a client device or an AI chip receives a respective initial AI model, that client device or AI chip may execute an AI task using the initial AI model to generate a respective updated AI model; this process may further be described in FIG. 4A. In some examples, an AI model may include multiple parameters (e.g., weights and other parameters of a CNN model) for use in running an AI chip in the client device.

In some examples, the training data may include one or more training datasets. Each dataset may include training data for obtaining an AI model for use in performing an AI task. For example, a first training dataset may include training data for training an AI model for use in recognizing a cat's face; and a second training dataset may include training data for training an AI model for use in recognizing a dog's face. In some examples, a training dataset may include one or more subsets of training data. For example, in a training dataset for recognizing a cat's face, a first subset may include training data collected over a first period of time, e.g., during a first month period. A second subset may include training data collected over a second period of time, e.g., during a second month period. In some examples, a subset of training data may include training data arranged in other suitable ways, such as data collected by time, by the breed of cats being pictured, by the imaging devices (e.g., a camera or a mobile phone) being used in collecting the data etc. Other suitable division of training data may also be possible. In some examples, the training data may include the pictures that include one or more cat faces, or no cat faces, and the ground truth data may include the classifications associated with the pictures, such as the class (e.g., the breed of a cat) to which each picture or a cat face in a picture belongs.

In some examples, the training configuration parameters may include one of more data values that may be used to adjust a training process. In a non-limiting example, the training configuration parameters may include data values such as $\beta$ and $\gamma$, which may be used by each client device in obtaining a local optimal AI model. This process will be described in further detail in FIG. 4A.

In providing the various data, such as the training data, the training configuration parameters, or the initial AI models, to one or more client devices and/or AI chips, in some examples, the host device may transmit the data to the multiple devices via a communication protocol, e.g., TCP/IP, Wi-Fi, Bluetooth, serial or parallel communications, or other communication protocols, wired or wirelessly. In some examples, the training data may be provided to the multiple devices via a database, such as a data repository, which is accessible by one or more of the multiple devices, where a device may retrieve a portion of the training data from the database.

With further reference to FIG. 3, process 300 may include receiving updated AI models at 308 from the one or more client devices (e.g., AI chips). In some examples, a client device may return an updated AI model to the host device. The host device may subsequently receive multiple AI models, each from a client device. Process 300 may subsequently determine an optimal AI model at 310 based on the updated AI models of one or more client devices and a performance value associated with each AI model. The process 300 may also update training configuration parameters at 312. The process 300 may repeat 308, 310, and/or 312 for a number iterations until the iteration count has exceeded a threshold $T_C$ at 316 and/or the time duration of the process has exceeded a threshold $T_D$ at 318. At each iteration, the iteration count increments at 314. Other stopping criteria may also be possible. At each iteration, process 300 continues receiving updated AI models from the client devices at 308 and determining the optimal AI model at 310.

Let $M''_{i,0}, M''_{i,1}, \ldots, M''_{i,N-1}$ represent the updated AI model from each client device $0, 1, 2, \ldots, N-1$ respectively, at ith iteration, where N represents the number of client devices. A model M may include one or more parameters of the CNN model, including weights and other parameters, such as the bias values. Model AI may have any suitable data structure. For example, model M may include a flat one-dimensional (1D) data structure that holds the CNN parameters and weights sequentially from a few bytes to a few megabytes or more. The parameters (including weights) of a CNN model may depend on the AI task for which the AI model is to be obtained, and the dataset for performing the AI task using the AI chip. For example, an AI task having different complexity levels may require different sets of CNN weights.

Let $A''_{i,0}, A''_{i,1}, \ldots, A''_{i,N-1}$ stand for the performance value of the updated AI model from each client device at the ith iteration. In some examples, a performance, value A may include a single value measured as the recognition accuracy associated with an AI model M, such as the updated AI model from a client device. For example, $A''_{i,0}$ may stand for the performance of model $M''_{i,0}$ and have a value of 0.5. If $H_i$ stands for the optimal AI model at ith iteration, then $H_i$ may be determined based on the received updated AI models and associated performance values from one or more client devices. In a non-limiting example, a host device may determine the optimal AI model for that host device by selecting a received updated AI model that has the best performance value among all client devices. For example, if the performance value represents the accuracy of recognition using an AI model, then selecting the best performance includes selecting an AI model that has the highest performance value among all client devices.

Although it is illustrated that, at each iteration, the optimal AI model may be determined based on the received AI models and associated performance values from one or more client devices, other variations may be possible. For example, the optimal AI model may be determined based on criteria other than the best performance value. In some examples, the optimal AI model may be determined based on the performance value of a subset of the client devices. For example, the process may select among top five of a total of ten client devices, or remove the bottom two client devices, in terms of performance value of the AI model associated with each client device.

Returning to FIG. 3, in updating the training configuration parameters, at 312, the process may adjust the training configuration parameters via an annealing process. For example, the configuration parameters may include data values $\beta$ and $\gamma$, which may be increased exponentially. In some examples, each of the values $\beta$ and $\gamma$ may increase by a range during the entire training process. To achieve the full (max) value for $\beta$ and $\gamma$ during the training process, each iteration in the process 300 may increase the values by a small incremental amount. In a non-limiting example, $\beta$ may be increased from an initial value of 1 to a value of 3. In an example, $\gamma$ may be increased from an initial value of 0.1 to a value of 2. If the maximum number of iterations (e.g., $T_C$) is, for example, 3400, then, at each iteration, $\beta$ may be multiplied by approximately 1.0003233. At each iteration, $\gamma$ may be multiplied by approximately 1.0008817.

At each iteration, before the stopping criteria is met at 316, 318, processes 308, 310 and 312 may repeat. At each iteration, process 300 may update the initial AI models for the client device(s) with the determined optimal AI model from 310 from a previous iteration, thus the training process in each client device may "restart." In other words, process 300 may determine the optimal AI model at 310, update the training configuration parameters at 312, and cause the training process at a client device to "restart." For example, before repeating receiving updated AI models at 308, the process 300 may transmit the updated optimal AI model and updated training configuration parameters obtained from e.g., 310 and 312 in a preceding iteration, to the client devices and wait for the updated AI models from the client devices. A client device may receive the optimal AI model and the updated training configuration parameters determined by the host device (e.g., 310, 312), where each client device may use the optimal AI model determined from 310 as an initial AI model, and perform a training process based on the updated initial AI model. The details will be further disclosed in FIG. 4A.

As another non limiting example, at each iteration, process 308 may instead update the initial AI models for the client device(s) with a respective previously output AI model for that client. If each of the client device(s) has a record of the AI model it last outputted, process 308 may instead equivalently neglect to update the initial AI model, since the client devices have already updated themselves. The determined optimal AI model from 310 can be stored for future use. For example, it can be used as another AI model to choose from on the next iteration of process 310. In other words, process 300 may determine the optimal AI model at 310 and store it. The process 300 may update the training configuration parameters at 312, and cause the training process at a client device to receive its previous output AI model with the updated training configuration parameters determined by the host device (e.g., 310, 312), where each client device may perform a training process based on the updated initial AI model. The details will be further disclosed in FIG. 4A.

With further reference to FIG. 3, once the stopping criteria is met, the process 300 may end the iterations and further validate the optimal AI model from the multiple client devices at 320. In some examples, in validating the optimal AI model (e.g., the optimal AI model determined from 310), the process 320 may further evaluate the received updated AI models (from 308) along with the optimal AI model determined from 310. For example, if there are 10 client devices (e.g., N=10 in FIG. 2), the number of AI models to be evaluated is 11. The process 320 may determine a selected number of optimal AI models from the AI models being evaluated, based on the performance value associated with each AI model. In some examples, the process 320 may select top five AI models. In some examples, in evaluating the AI models, the process 320 may use a validation dataset. The validation dataset may be independent from the training dataset. The validation dataset may also include a portion of the training dataset.

Additionally, the process 320 may further evaluate the selected number of optimal AI models using the entire training dataset, and determine a final optimal AI model that has the best performance value. In some examples, the performance value associated with an AI model may be an accuracy of the AI model. In some examples, the performance value may include other criteria, such as computation time for an AI model to be run in an AI chip, or the accuracy of the AI model, or a combination thereof. In the example above, the process 320 may further evaluate the selected top five optimal AI models and determine an optimal AI model that has the best performance value among the top optimal AI models. Upon determining the AI model with the best performance value, process 320 will have validated the optimal AI model and output the optimal AI model at 322.

Here, the optimal AI model after the validation at 320 may be the same optimal AI model from 310 or may be different from the optimal AI model prior to validation.

Once the final optimal AI model is determined, the process 300 may upload the optimal AI model at 324 into one or more client devices (e.g., AI chips) for performing future AI tasks. In some examples, the optimal AI model may be shared among multiple processing devices on the network, in which any device may load the optimal AI model into an embedded CeNN of an AI chip and execute the CeNN to perform an AI task, based on the loaded optimal AI model.

Figure 4A:
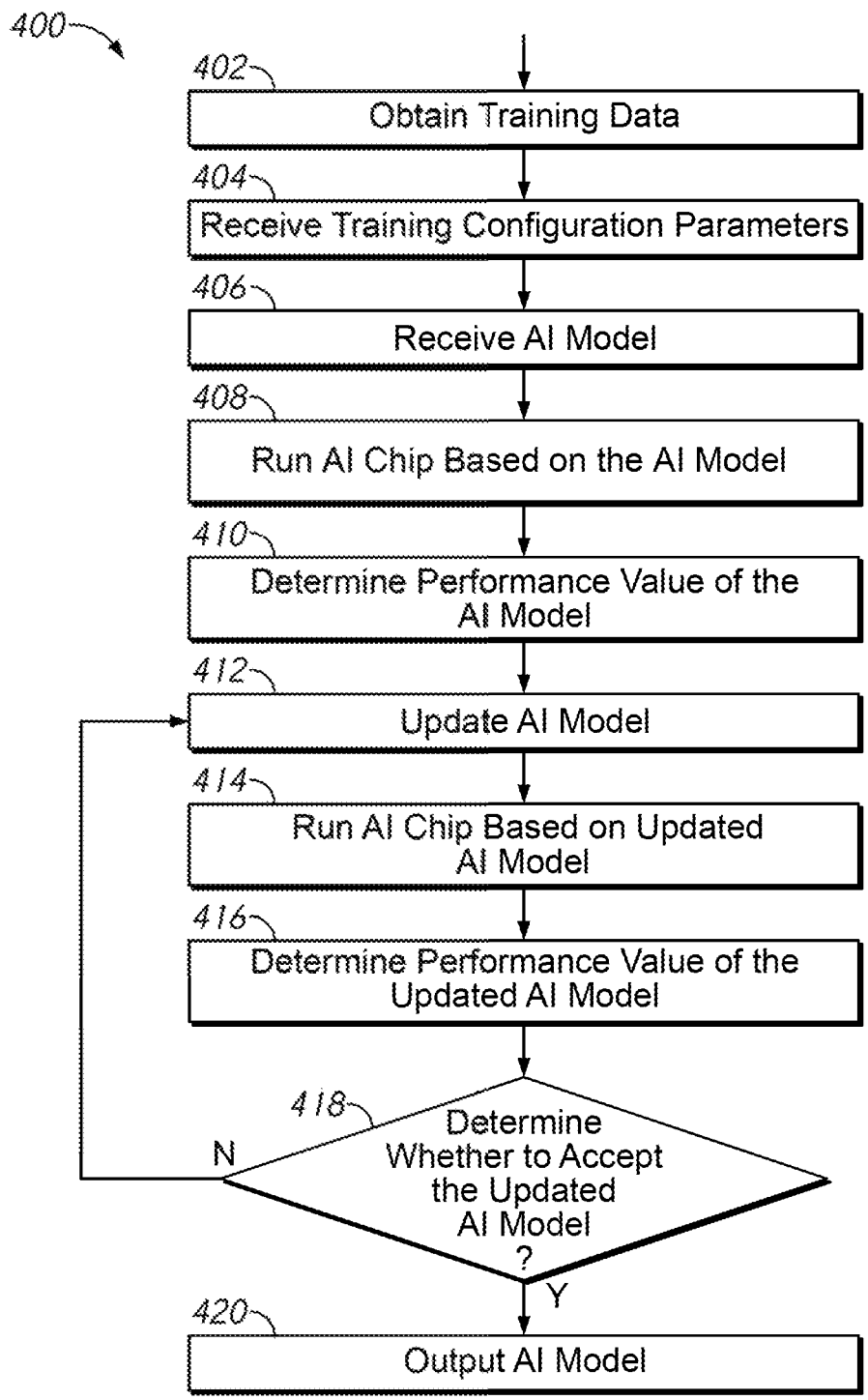
FIG. 4A illustrates a diagram of an example process of obtaining a local AI model that may be implemented in a client device in accordance with various examples described herein.

Now FIG. 4A illustrates a diagram of an example process of obtaining a local AI model in a training process that may be implemented in a client device in accordance with various examples described herein. In some examples, a process 400 may be implemented in a client device, a host device and/or an AI chip, such as shown in FIG. 1. The process 400 may train an AI model via one or more iterations. In some examples, the process 400 may implement one or more functions in FIG. 2 in a client device, whereas one or more functions in FIG. 2 may be implemented in FIG. 3 in a host device. For example, the process 400 may implement boxes 208-216 in Device 1 (in FIG. 2), or in other devices such as Device 2, . . . , Device N. At the beginning of the training process, the process 400 may include obtaining training data at 402, receiving training configuration parameters at 404, and/or receiving an (initial) AI model at 406. For example, the training dataset may be residing at any of the devices (host or client devices) on the communication network (e.g., 102 in FIG. 1) and may be accessible to any other devices. In some examples, 402, 404, 406 may occur at the start of each iteration in the process 300 (e.g., 308 in FIG. 3). The process 400 may run an AI chip to infer the performance of the AI model at 408. For example, in running the AI chip, the process 408 may load the AI model into the AI chip and execute the AI chip to perform an AI task, using the training data from 402. The process 400 may further determine the performance value of the AI model at 410 by evaluating the result generated from the AI chip based on the AI model.

With further reference to FIG. 4A, the process 400 may start the iteration at 412. For example, at each iteration, the process may include updating the AI model at 412 based on the current AI model. At the start of the iteration, the current AI model may be the initial AI model received at 406 (from a host device, for example). During subsequent iterations, the current AI model may be the last updated AI model obtained from 412.

In some examples, the process 400 may update the AI model at 412 by various methods. For example, the process 412 may generate an updated AI model by incurring a perturbation to the initial AI model. For example, at the mth iteration in process 400, an updated AI model for client device i may be represented as $M_{i\_m}=M_{i\_m-1}+\Delta M$, where $\Delta M$ is the perturbation. In some examples, process 400 may include a different process in which a small change to the parameters of the AI model is made. In some examples, an AI model may include a 1D column vector, which contains all of the weights and/or parameters of the AI model arranged sequentially in 1D. When an AI model is represented by a 1D column vector, a subtraction of two AI models may include a 1D column vector containing multiple parameters, each of which is a subtraction of two corresponding parameters in the 1D column vectors that represent the two AI models, respectively. An addition of two AI models may include multiple parameters, each of which is a sum of two corresponding parameters in the two AI models. An average of multiple AI models may include parameters, each of which is an average of the corresponding parameters in the multiple AI models. Similarly, an AI model may be incremented (added or subtracted) by a perturbation. The resulting model may contain multiple parameters, each of which includes a corresponding parameter in the AI model incremented (added or subtracted) by a corresponding parameter in the perturbation. In some examples, an addition of two AI models may be in discrete or finite field. For example, the addition of scalars and biases in two (or multiple) CNN models may be done in a real coordinate space, subject to capping at their respective minimum and maximum values. In another example, the addition of masks in multiple CNN models may be done in finite field, in which each cell in the resulting mask may take a value from said finite field.

Returning to block 412 in FIG. 4A, updating the AI model may include updating one or more parameters of the AI model with a probability to change and an amplitude of change for a group of parameters, such as scalar, mask and bias in a CNN model. For example, the probabilities to change the scalar, the mask and the bias may each be 0.01, 0.001, and 0.01, respectively. The amplitude of change for scalar and bias may be 0.001. In an example implementation, the process may generate a random number, e.g., in the range of 0 and 1.0, and compare the random number to the probabilities for the group of parameters. If the random number is below the probability for a given group of parameters, that group of parameters may change according to the amplitude of change. In case of the previous example, a random number may be generated. If the random number is, less than 0.01, the process may subsequently change the scalar by 0.001. In changing the values in a mask, the process may change each value in the mask to its neighboring value. For example, if a value in a mask is a binary having two values {+1, −1}, each change of value may become a switching between the two values (−1 or +1).

In some examples, the process may also enumerate the weight indices (e.g., 1, 2, 3 etc.), or shuffle one or more weights randomly. Additionally, and/or alternatively, the process may sequentially flip the weight corresponding to each index for each iteration, and start over once a weight has been accepted (to be further explained). Updating the AI model at 412 may result in one or more parameters (including weights) of the AI model changed. These weights and/or parameters may be viewed as proposed weights, subject to acceptance or rejection, which is further explained.

With further reference to FIG. 4A, the process 400 may further include inferring the performance of the updated AI model (one or more proposed weights and/or parameters) by running the AI chip in the client device based on the updated (proposed) AI model at 414 and determining the performance value of the updated AI model at 416. In some examples, running the AI chip in the client device may include causing the AI chip to execute an AI task in the AI chip where an embedded CeNN of the AI chip contains the updated AI model, such as a CNN. In other words, if the AI chip is a hardware-based chip, the weights and/or parameters of the updated AI model are loaded into the CeNN of the AI chip to be used in performing the AI task. An AI task may depend on the dataset. For example, a dataset may include training data obtained at 402. For a recognition task using the training data, a performance value may be measured against the AI model being used. For example, an accuracy value may be determined at 416 based on the result of a given recognition task using the updated AI model.

Upon determining the performance value of the updated AI model, process 400 may further determine whether to accept the updated AI model based on the inferred performance of the updated model as described in 414, 416. If it is determined that the updated AI model is rejected, the process 400 may repeat updating the AI model at 412, until the updated AI model is accepted. In some examples, each of the rejected updated AI model may be abandoned. In other words, if an updated AI model is rejected, the process 400 may repeat updating AI model at 412 based on the AI model before the rejected AI model rather than the rejected AI model. If it is determined that the updated AI model is accepted, the process 400 may output the updated AI model at 420. For example, the process 400 may communicate the output AI model to the host device to receive (e.g., 308 in FIG. 3).

In determining whether to accept or reject an updated AI model, the process 419 may determine to accept the updated AI model based on a probability, which indicates a probability that the updated AI model be accepted. This probability may be determined based on the performance value of the current AI model and the updated AI model. In some examples, the probability for accepting the updated AI model may also be based on the weights and/or parameters of other client devices. In a non-limiting example, if the weights of an AI model have binary values, the probability may be determined as:

$$p = \left(e^{-\beta(E(w'^r)-E(w^r))}\right)\frac{\cosh(\gamma(\bar{w}_i + 2w_i'^r))}{\cosh(\gamma\bar{w}_i)}$$

where $\beta$ and $\gamma$ are the training configuration parameters. $w^r$ are the weights of the current AI model, where r stands for the rth client device. For example, if there are N client devices participating in the training in parallel, then r is in the range of $\{1, 2, \ldots N\}$. $w_i^r$ stands for the ith weight of the current AI model in the rth client device (e.g., AI chip), where i is in the range of $\{1, 2, \ldots W\}$, where W is the number of weights and/or parameters in the AI model, such as a CNN model. Similarly, $w'^r$ are the weights and/or parameters of the updated AI model for the rth client device. The sum of weights and/or parameters among the multiple client devices are defined as $$\bar{w}_i = \sum_{r=1}^{N} w_i^r.$$

$E(w^r)$ may stand for the performance value of the current AI model. For example, $E(\ )$ may stand for the number of incorrectly classified samples given the training data obtained (e.g., in 402). In some examples, $E(\ )$ may stand for 1−the accuracy of recognitions of the AI model. As shown in the equation above, the probability may differ for each weight i in the AI model. In some examples, if multiple weights have been updated (e.g., at 412), the probability of accepting the updated AI model may include a product of the cosh terms for the multiple weights.

In some examples, some of the weights and/or parameters of an AI model may have a non-binary value, i.e., more than two values. In such case, as an example, the probability for accepting the updated AI model may be defined as:

$$p = \left(e^{-\beta(E(w'^r)-E(w^r))-\gamma((w_i'^r)^2-(w_i^r)^2)}\right) \frac{\Sigma_k e^{-\gamma(Rk^2-2k(w_i+w_i'^r-w_i^r))}}{\Sigma_k e^{-\gamma(Rk^2-2kw_i)}}$$

where k is summed over all allowed values of $w_i^r$. In a non-limiting example, if the weights may include a 2-bit signed integer, then k may be summed over $\{\pm 1, 0\}$. In another non-limiting example, if the weights may include a 12-bit unsigned integer, then k may be summed over $\{0, 1, 2, \ldots, 4095\}$. In some examples, if multiple weights have been updated (e.g., at 412), the probability of accepting the updated AI model may include a product of the summed terms over k the multiple weights. Similarly, the elements next to $\gamma$ in the exponent will be summed over i for all changed weights.

In some examples, the client devices may not all be equally fast or may not update the AI models equally frequently (e.g., some may reject more than others). In some examples, a client device may choose to wait until the weights and/or parameters in all client devices are updated, and calculate the value $$\overline{w}_i = \sum_{r=1}^{N} w_i^r$$

(synchronous update). In another non limiting example, a client device may choose to not wait, and asynchronously use available weights from other devices to calculate $$\overline{w}_i = \sum_{r=1}^{N} w_i^r$$

(asynchronous update). In some examples, some client devices may choose synchronous updates, while other client devices may choose asynchronous updates. In some examples, a client device may be configured to perform synchronous update or asynchronous update alternately for different iterations in a training process, e.g., the process 300 in FIG. 3.

In an example implementation, the process 418 may generate a random number, e.g., in the range of 0 and 1.0, and compare the random number to the probabilities for accepting the updated AI model. If the random number does not exceed the probability, that process may determine that the updated AI model is accepted. Otherwise, the process may continue without accepting the updated AI model.

With further reference to FIG. 4A, if it is determined that the updated AI model is accepted, process 400 may proceed and output the AI model at 420. In some examples, the process may return the updated AI model to the host device in which the training process 400 is implemented. If it is determined that the updated AI model is not accepted, the process may repeat the iteration at 412 and continue generating updated AI models until it is accepted. This iteration, which continues until an updated AI model is accepted, may be referred to as a greedy approach in that the client device keeps trying until an updated AI model is accepted.

Figure 4B:
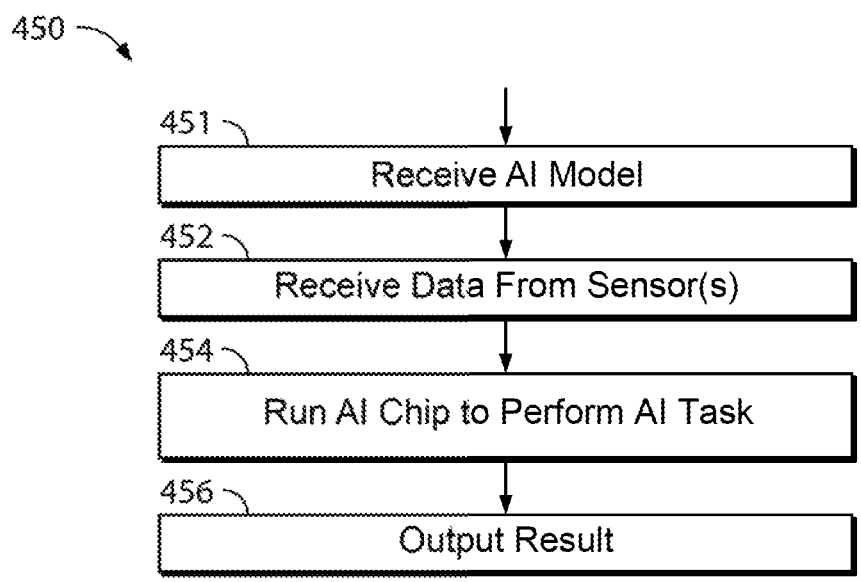
FIG. 4B illustrates a diagram of an example process of using an AI chip to perform an AI task in accordance with various examples described herein.

FIG. 4B illustrates a diagram of an example process of using an AI chip to perform an AI task in accordance with various examples described herein. Once an optimal AI model is determined, such as in the training process 300 (in FIG. 3), the optimal AI model may be uploaded into an AI chip (e.g., 324 in FIG. 3) for performing future AI tasks. Any of the client devices, or a client device having an AI chip may be configured to implement a process, such as process 450. The process 450 may include receiving an AI model at 451, where the received AI model may be uploaded to the AI chip in the client device after a training process is complete. The process 450 may also include receiving data from one or more sensors at 452. For example, the received data may be captured audio or images from a mobile phone camera, or an audio or video capturing device. The process 450 may run the AI chip to perform an AI task, such as a recognition task at 454 to generate a recognition result, and output the recognition result at 456.

In a non-limiting example, a CNN model may be obtained via a training process in a parallel configuration, such as disclosed in FIG. 3 and FIG. 4A, and it may be loaded into the AI chip for execution. For example, respective weights and/or parameters of a CNN model that are trained for face recognition tasks may be loaded into an embedded CeNN in the AI chip. A host or client device may cause the AI chip to perform various AI tasks using the trained weights and/or parameters. For example, a client device may feed an input image into an AI chip and receive an image recognition result from the AI chip. The recognition result may indicate which class the input image belongs to. In a non-limiting example, the CNN model may be capable of recognizing one or more classes from an input image, such as a cry and a smile face. In an example application, an AI chip may be installed in a camera and store weights and/or parameters of the CNN model. The AI chip may be configured to receive a captured image from the camera, perform an image recognition task based on the captured image and the stored CNN model, and output the recognition result. In outputting the recognition result, the camera may display, via a user interface, the recognition result. For example, the CNN model may be trained for face recognition. A captured image may include one or more facial images associated with one or more persons. The recognition result may include the names associated with each input facial image. The user interface may display a person's name next to or overlaid on each of the input facial image associated with the person.

Figure 5:
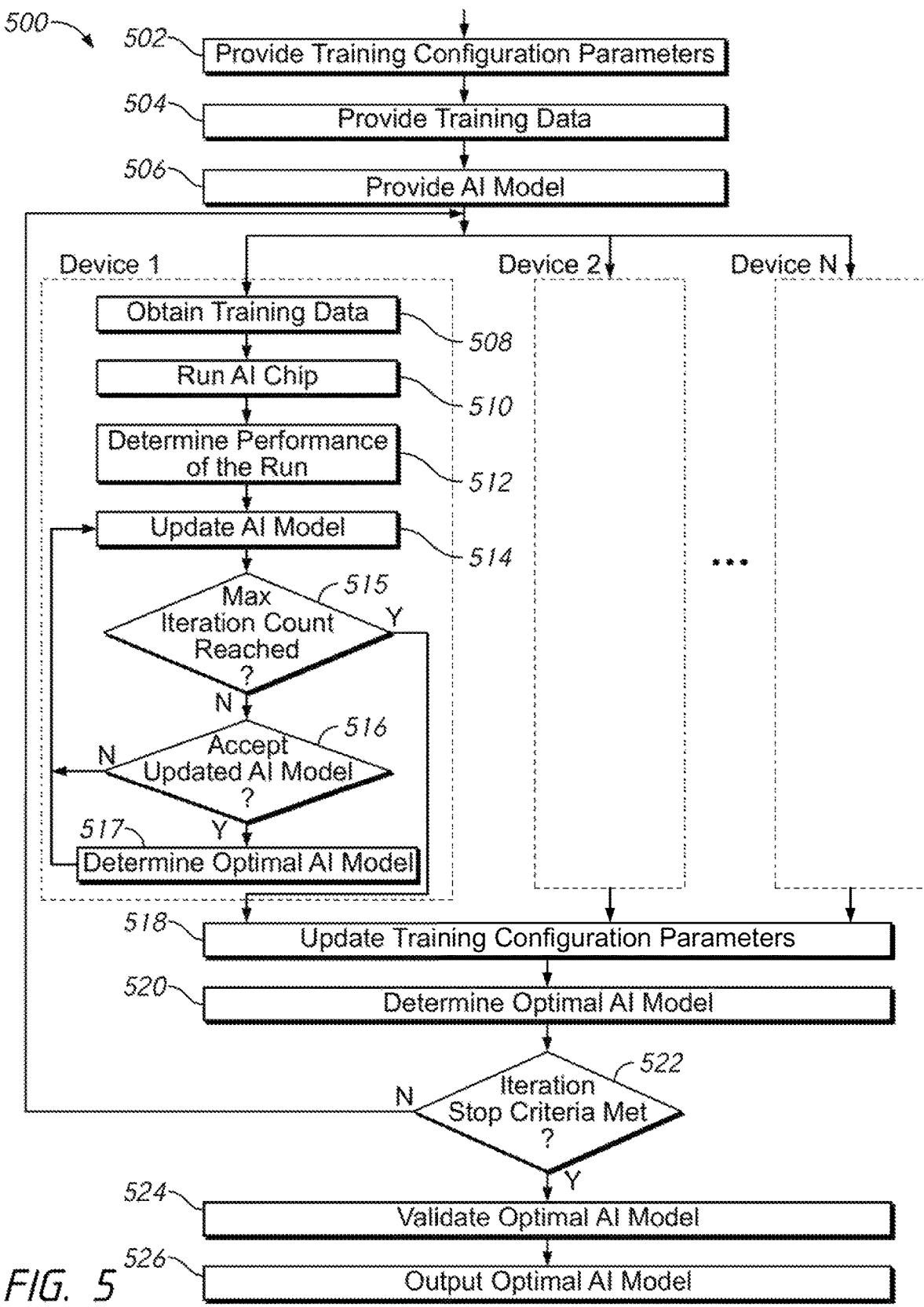
FIG. 5 illustrates a diagram of an example process of obtaining an optimal AI model in a parallel configuration in accordance with various examples described herein.

FIG. 5 illustrates a diagram of an example process of obtaining an optimal AI model in a parallel configuration in accordance with various examples described herein. In some examples, a process 500 may be implemented to train an AI model. The process 500 may have a similar parallel configuration as that in the process 200 (in FIG. 2). As shown in FIG. 5, a process for each of the devices: Device 1, Device 2, ..., Device N, is implemented in a similar fashion as in FIG. 2, except each device may use a less greedy approach in generating the updated AI model. For example, in some examples, the process 500 may include providing training configuration parameters at 502, providing training data at 504, and/or providing initial AI models at 506. For example, process 504 may retrieve training dataset and provide a subset data shuffled from the larger training dataset. These processes 502, 504, 506 prepare data and AI model that may be used by a process for each of the multiple devices Device 1, Device 2, ..., or Device N. The process 500 may include multiple iterations, which may stop when an iteration stopping, criteria is met at 522. During each iteration, a new training process may be started for each of the multiple devices. Each of the multiple devices may include an AI chip for running an AI task with an AI model inside the AI chip. Each of the multiple devices may upload an AI model to the AI chip in the device. A device may also be capable of updating the AI model. In a training process, training data for each of the multiple devices may contain a subset data shuffled from a larger training dataset.

In some examples, a process for one of the multiple devices may include obtaining training data at 508, running the AI chip in the device at 510, determining a performance value of the run at 512, where the performance value may be indicative of the performance of the AI model used in the run. The process for each device may include multiple iterations, which stop when a maximum iteration count has been reached at 515. In each iteration, the process 500 may further include updating the AI model at 514. If the maximum iteration count has not been reached, the process may determine whether to accept the updated AI model at 516. If it is determined that the updated AI model is not accepted, the process may repeat the iteration by updating the AI model at 514. If it is determined that the updated model is accepted, the process may determine and cache an optimal AI model at 517 before repeating the iteration at 514.

If the maximum iteration count has been reached, the process may output the cached optimal AI model of each device. The process 500 may further update training configuration parameters at 518, and determine an optimal AI model from among the multiple devices at 520, and repeat the training process for the multiple devices until the iteration stopping criteria is met at 522. When the stopping criteria is met at 522, the process 500 may validate the optimal AI models at 524 and obtain an optimal AI model at 526. The details of the process 500 may further be explained in detail m FIG. 6.

In comparing FIG. 2 with FIG. 5, the processes in each of the devices (e.g., Device 1, Device 2, . . . , Device N) differ in that the process 200 in FIG. 2 is considered greedier because it continues updating the AI model until accepted, whereas the process 500 in FIG. 5 may stop the iterations in searching for updated AI model after a maximum iteration count has been reached. In some examples, the processes as shown in FIGS. 2 and 5 may be implemented alternately in a single training process. For example, at a given iteration, a host device may choose to implement 214, 216 (the greedier approach in FIG. 2). In a subsequent iteration in the same training process, the host may implement 514-517 (in FIG. 5). As a non-limiting example, a process may choose to implement the greedier approach (e.g., 214, 216 in FIG. 2) at every 20 iterations, and implement processes 514-517 (in FIG. 5) at all other iterations. Alternatively, and/or additionally, a process may choose to implement the greedier approach (e.g., 214, 216 in FIG. 2) at the last few iterations, and implement processes 514-517 (in FIG. 5) at all other iterations. Other configurations may also be possible.

Figure 6:
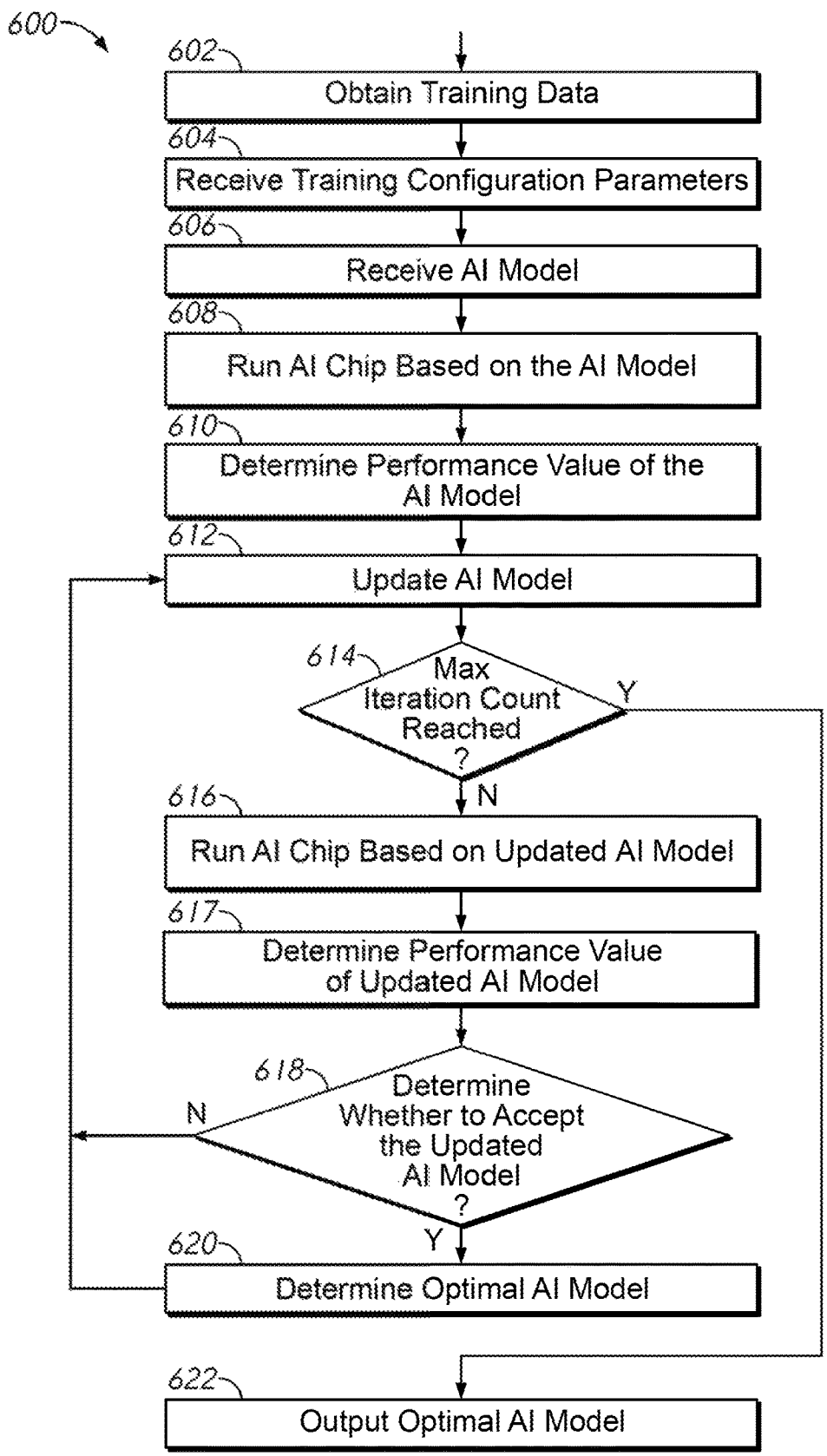
FIG. 6 illustrates a diagram of an example process of obtaining a local AI model that may be implemented in a client device in accordance with various examples described herein.

Now FIG. 6 illustrates a diagram of an example process of obtaining a local AI model in a training process that may be implemented in client device in accordance with various examples described herein. A process 600 may be implemented in a process for each of the multiple devices in FIG. 5. In some examples, the process 600 may be implemented in a client device, a host device and/or an AI chip, such as shown in FIG. 1. The process 600 may train an AI model via one or more iterations. At the beginning the training process, the process 600 may include obtaining training data at 602, receiving training configuration parameters at 604, and/or receiving an (initial) AI model at 606. Boxes 602, 604 and 606 may be similar to boxes 402, 404 and 406, respectively in FIG. 4A. The process 600 may run an AI chip based on the (initial) AI model at 608 to infer the performance of the AI model. For example, in running the AI chip, the process 608 may load the AI model into the AI chip and execute the AI chip to perform an AI task, such as a recognition task, using the training data from 602. The process 600 may further determine the performance value of the AI model at 610 by evaluating the result generated from the AI chip based on the AI model.

With further reference to FIG. 6, the process 600 may start the iteration at 612. For example, at each iteration, the process may include updating the AI model at 612 based on the current AI model. At the start of the iteration, the current AI model may be the initial AI model received at 606 (from a host device, for example). During subsequent iterations, the current AI model may be replaced by the last updated AI model brained from 612. In some examples, the process may update the AI model at 612 by various methods in a similar fashion as described in 412 (in FIG. 4A).

With further reference to FIG. 6, the process 600 may further determine whether a maximum iteration count has been readied at 614. This may be less greedy than the process 400 (in FIG. 4A) in that the process stops when a stopping criteria is met, without necessarily waiting for the updated AI model to be accepted. If the maximum iteration count has not been reached at 614, the process 600 may also infer the performance of the updated AI model (one or more proposed weights and/or parameters) by running the AI chip in the client device to perform an AI task based on the updated (proposed) AI model at 616. In some examples, running the AI chip in the client device may include causing the AI chip to execute an AI task, such as a recognition task (e.g., face recognition, voice recognition, object recognition etc.) in the AI chip where an embedded CeNN of the AI chip contains the updated AI model, such as a CNN. In other words, if the AI chip is a hardware-based chip, the weights and/or parameters of the updated AI model are loaded into the CeNN of the AI chip to be used in performing the recognition task. A recognition task may depend on the dataset. For example, a dataset may include training data obtained at 602. In some examples, the process 600 may also determine the performance value of the updated AI model at 617. For example, for an AI recognition task using the training data, a performance value may be measured against the updated AI model being used. For example, an accuracy value may be determined at 617 based on the result of a given recognition task using the updated AI model.

Upon determining the performance value of the updated AI model, process 600 may further determine whether to accept the updated AI model at 618 based on the inferred performance of the updated model from 617. If it is determined that the updated AI model is accepted, the process 600 may determine an optimal AI model at 620 and repeat updating the AI model at 612, until the maximum iteration count is reached at 614. In determining the optimal AI model, the process may cache a local optimal AI model based on the performance values from each previous iteration, and progressively compare the performance value of the updated AI model with the cached local optimal AI model as the AI model is updated. If the performance value of the updated AI model is higher than that of the local optimal AI model, the local optimal AI model is replaced by the updated AI model and cached; otherwise, the local optimal AI model remains unchanged. If it is determined that the updated AI model is rejected, the process 600 may repeat updating the AI model at 612.

Returning to box 614, if the maximum iteration count has been reached, then the process 600 may output the cached optimal AI model at 622. For example, the process 600 may communicate the output AI model to the host device to cause the host device to start box 518 (in FIG. 5).

In determining whether to accept or reject an updated AI model, the process 618 may determine the probability of acceptance in a similar manner as described in process 418 in FIG. 4A. In an example implementation, the process 618 may generate a random number, e.g., in the range of 0 and 1.0, and compare the random number to the probabilities for accepting the updated AI model. If the random number does not exceed the probability, that process may determine that the updated AI model is accepted. Otherwise, the process may continue without accepting the updated AI model. The probability for accepting the updated AI model may be determined similar to the process described in FIG. 4A.

Figure 7A:
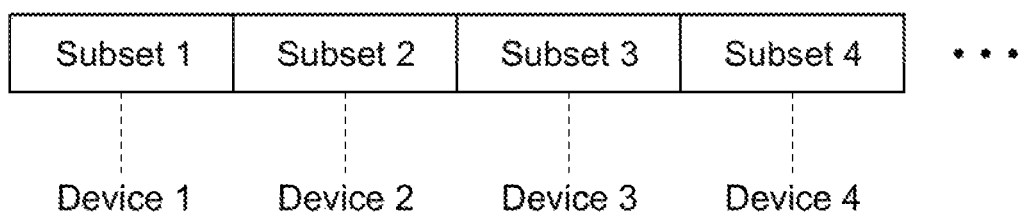
FIGS. 7A-7D illustrate various methods of obtaining training data in a parallel configuration in accordance with various examples described herein.
Figure 7B:
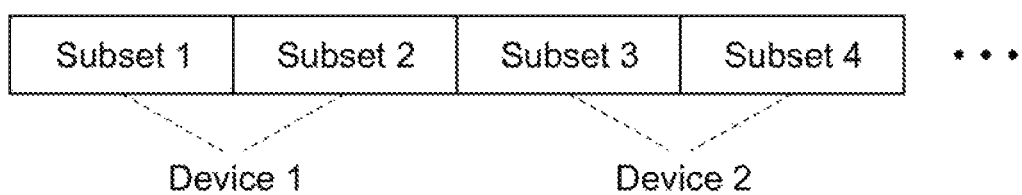
Figure 7C:
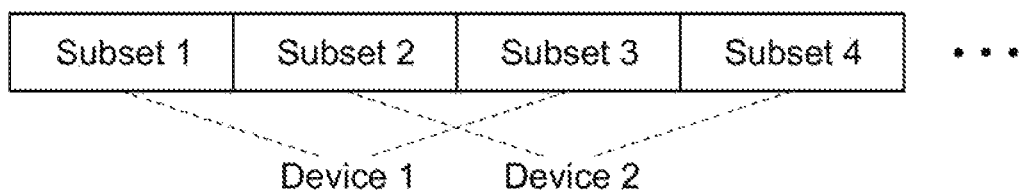
Figure 7D:
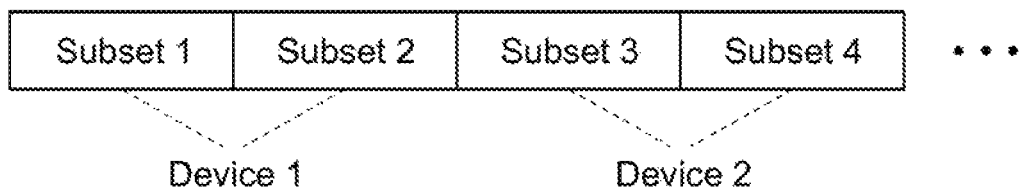
Figure 7D:
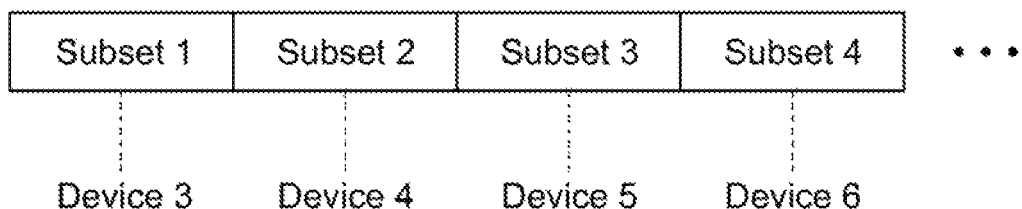

FIGS. 7A-7D illustrate various methods of obtaining training data in a parallel configuration in accordance with various examples described herein. These methods of obtaining training data may be implemented in a host device or a client device, and may be applicable to the various processes described in FIGS. 1-6, such as 204 in FIG. 2, 302 in FIG. 3, 402 in FIG. 4A, 504 in FIG. 5, or 602 in FIG. 6. In some examples, as shown in FIG. 7A, a training dataset may include multiple subsets of training data. Each of the client devices participating in the training may obtain a respective subset of the multiple subsets. In FIGS. 7B and 7C, each of the client devices may obtain one or more subsets of the multiple subsets of training data. In FIG. 7D, multiple client devices participating in the training process may obtain multiple training datasets. For example, device 1 and device 2 may each use one or more subsets of training data in training dataset I, whereas devices 3-6 may each use a respective subset of training data in training dataset II. In some examples, as different training datasets may not be easily accessible to all devices, multiple host devices may be used to each handle a training dataset, where each host device may include one or more client devices performing the training in parallel (e.g., process 200 in FIG. 2, or process 500 in FIG. 5). Yet, as shown in the processes in FIGS. 2-6, the multiple client devices under each host device may be communicable to share their updated AI model at a given iteration during the training.

In an example implementation, user A is in California and user B is in New York. User A has a first training dataset containing pictures 1-4, and User B has a second training dataset containing pictures 5-8, where none of them has access to the training dataset of the other because it may not be practical to send each other all the training datasets due to limited network bandwidth, storage limitations, and/or privacy issues. In such case, both User A and User B may each proceed with their own training process in parallel, such as process 200 (in FIG. 2) by using separate training datasets, and each user may have one or more client devices (e.g., AI chips), such as Device 1, Device 2, . . . , Device N. In each iteration of the training process (e.g., boxes 208-222), the training data for each of the multiple devices are drawn from a larger training dataset without overlapping (e.g., 402 in FIG. 4). If the larger training dataset has become empty, the previously drawn data may be shuffled and reused.

In a non-limiting example, during the first iteration, User A's device 1 may use pictures 1 and 3; device 2 may use pictures 1 and 4; and so on. User B's device 1 may use pictures 7 and 8; device 2 may use pictures 5 and 6; and so on. During the second iteration, User A's device 1 uses pictures 2 and 4; device 2 uses pictures 2 and 3; and so on. User B's device 1 uses pictures 5 and 6; device 2 uses 7 and 8; and so on. During the third iteration, all datasets are exhausted, and hence old data may be shuffled and reused. Each device may draw data in the same manner as in the first iteration. In some examples, during subsequent iterations, the training data may be further shuffled. For example, User A may use pictures 3 and 4 in the training. User B may use pictures 6 and 7 in the training. In another iteration, User A may use pictures 1 and 2 in the training. User B may use pictures 5 and 8 in the training. The shuffling of training data may vary.

In some examples, the subsets of training data may be randomly shuffled during each iteration. In some examples, the amount of training data drawn from each dataset may vary. For example, Users A and B may draw half of the training dataset each time. In another example, different users may choose to draw some other fraction of the dataset, including a partial dataset or the entire dataset. As shown in the above example, multiple devices may participate in parallel in a training process, e.g., 200 (FIG. 2), 500 (FIG. 5). However, multiple devices may use non-overlapping or overlapping training data. In some examples, multiple devices may also use entirely separate training datasets.

It is appreciated that the disclosures of various embodiments in FIGS. 1-7 may vary. For example, the number of iterations in process 200 in FIG. 2, process 500 in FIG. 5, process 300 in FIG. 3, and process 600 in FIG. 6 may all vary and may be independent. In a non-limiting example, the number of iterations in process 600 for a client device may be in the range of 10-100, and the number of iterations in processes, 200, 300 or 500 for a host device may be 1000. Other values may also be possible.

Figure 8:
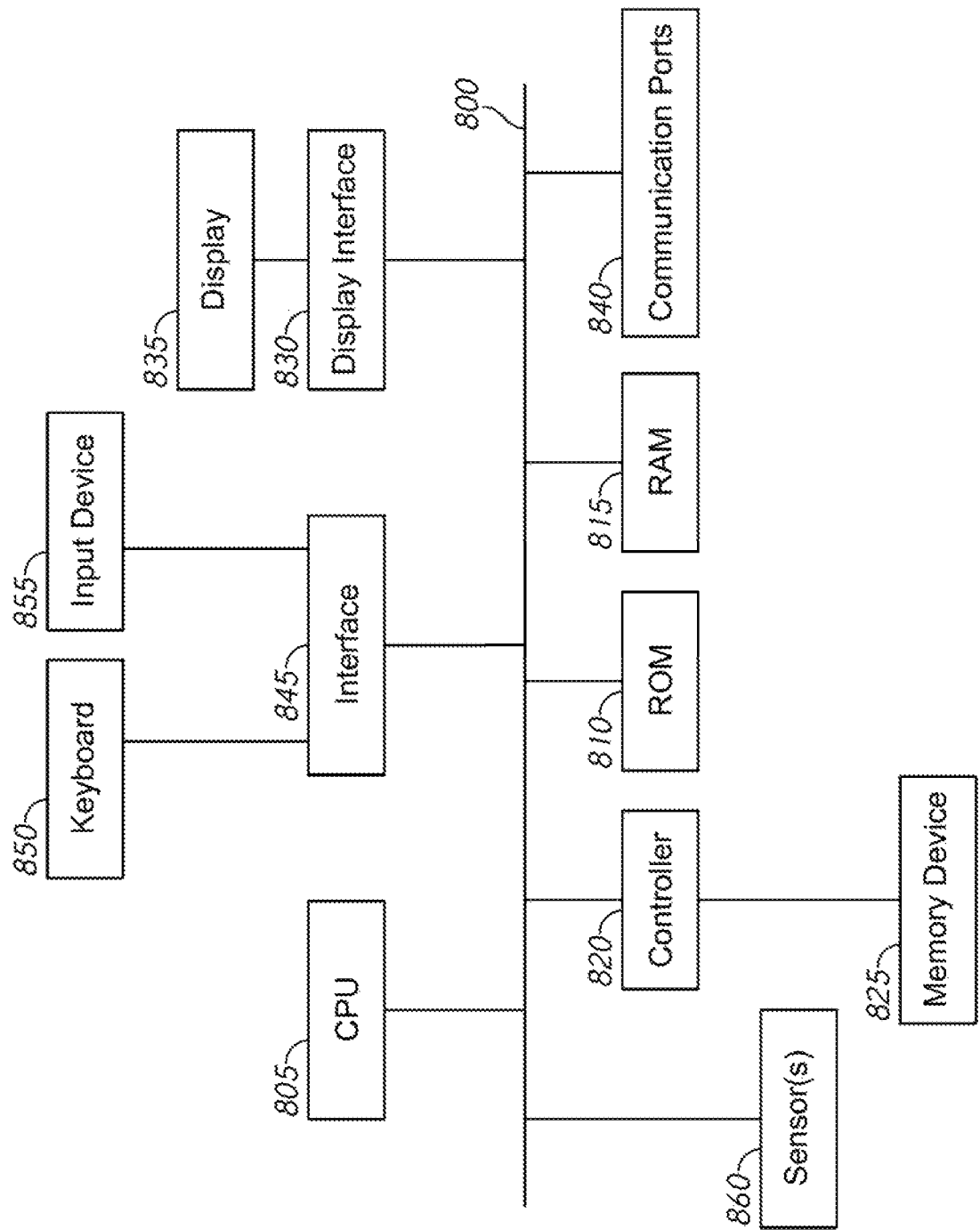
FIG. 8 illustrates various embodiments of one or more electronic devices for implementing the various methods and processes described herein.

FIG. 8 depicts an example of internal hardware that may be included in any electronic device or computing system for implementing various methods in the embodiments described in FIGS. 1-7. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a process, whether a central processing unit (CPU) or a graphics processing unit (GPU) or a combination of the two. Read only memory (ROM), random access memory (RAM), flash memory, hard drives, and other devices capable of storing electronic data constitute examples of memory devices 825. A memory device, also referred to as a computer-readable medium, may include a single device or a collection of devices across which data and/or instructions are stored.

An optional display interface 830 may permit information from the bus 800 to be displayed on a display device 835 in visual, graphic, or alphanumeric format. An audio interface and audio output (such as a speaker) also may be provided. Communication with external devices may occur using various communication ports 840 such as a transmitter and/or receiver, antenna, an RFID tag and/or short-range, or near-field communication circuitry. A communication port 840 may be attached to a communications network, such as the Internet, a local area network, or a cellular telephone data network.

The hardware may also include a user interface sensor 845 that allows for receipt of data from input devices 850 such as a keyboard, a mouse, a joystick, a touchscreen, a remote control, a pointing device, a video input device, and/or an audio input device, such as a microphone. Digital image frames may also be received from an imaging capturing device 855 such as a video or camera that can either be built-in or external to the system. Other environmental sensors 860, such as a GPS system and/or a temperature sensor, may be installed on system and communicatively accessible by the processor 805, either directly or via the communication ports 840. The communication ports 840 may also communicate with the AI chip to upload or retrieve data to/from the chip. For example, the optimal AI model obtained from process 200 may be shared by all of the processing devices on the network. Any device on the network may receive the optimal AI model from the network and upload the optimal AI model, e.g., CNN weights, to the AI chip for performing an AI task via the communication port 840 and an SDK (software development kit). The communication port 840 may also communicate with any other interface circuit or device that is designed for communicating with an integrated circuit.

Optionally, the hardware may not need to include a memory, but instead programming instructions are run on one or more virtual machines or one or more containers on a cloud. For example, the various methods illustrated above may be implemented by a server on a cloud that includes multiple virtual machines, each virtual machine having an operating system, a virtual disk, virtual network and applications, and the programming instructions for implementing various functions in the robotic system may be stored on one or more of those virtual machines on the cloud.

Various embodiments described above may be implemented and adapted to various applications. For example, the AI chip having a CeNN architecture may be residing in an electronic mobile device. The electronic mobile device may use the built-in AI chip to produce recognition results and generate performance values. In some scenarios, obtaining the CNN can be done in the mobile device itself, where the mobile device retrieves training data from a dataset and uses the built-in AI chip to perform the training. In other scenarios, the processing device may be a server device in the communication network (e.g., 102 in FIG. 1) or may be on the cloud. These are only examples of applications in which an AI task can be performed in the AI chip.

The various systems and methods disclosed in this patent document provide advantages over the prior art, whether implemented standalone or combined. For example, using the systems and methods described in FIGS. 1-8 may help obtain the optimal AI model using multiple networked devices and multiple AI chips in a parallel configuration. The various devices in the parallel configuration may communicate with each other in either centralized or decentralized or distributed network. This parallel configuration and networked approach help the system to narrow the search space of the AI model during the training process thus the system may converge to the optimal AI model faster. Furthermore, the particular formulae for accept/reject in the examples may reduce overfitting. The above disclosed embodiments also allow different subsets of training data to be shuffled to obtain a local optimal AI position model for each AI chip. In some examples, one or more functions in the process 200 (FIG. 2) or the process 500 (FIG. 5) may be implemented in a host device and multiple client devices. Alternatively, and/or additionally, the one or more functions in these processes may also be implemented in a single or multiple host devices, and/or a single or multiple client devices. For example, as shown in FIG. 1, a host device 116 may include multiple AI chips. In such case, all of the functions in FIG. 2, for example, may be implemented in the host device 116, whereas running AI chips (e.g., 210) may be directly performed on one or more physical AI chips under the host device 116. Above illustrated embodiments are described in the context of generating a CNN model for an AI chip (physical or virtual), but can also be applied to various other applications. For example, the current solution is not limited to implementing the CNN but can also be applied to other algorithms or architectures inside an AI chip.

It will be readily understood that the components of the present solution as generally described herein and illustrated in the appended figures could be arranged and designed in a wide variety of different configurations. Thus, the detailed description of various implementations, as represented herein and in the figures, is not intended to limit the scope of the present disclosure, but is merely representative of various implementations. While the various aspects of the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One ordinarily skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Other advantages can be apparent in those skilled in the art from the foregoing specification. Accordingly, it will be recognized by those skilled in the art that changes, modifications, or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:
1. A system comprising:
a plurality of artificial intelligence (AI) chips; and
a processing device coupled to the plurality of AI chips and configured to:
receive respective first AI models from the plurality of AI chips, wherein each of the plurality of AI chips is configured to perform a first search, the first search comprising:

(i) generating a first updated AI model based at least on a first current AI model in an previous iteration;
(ii) determining whether to accept the first updated AI model; and
(iii) upon determining to accept the first updated AI model, outputting the first updated AI model as a first AI model; otherwise, updating the first current AI model with the first updated AI model and repeating steps (i)-(iii);
receive respective second AI models from the plurality of AI chips, wherein each of the plurality of AI chips is configured to perform a second search, the second search comprising:
(iv) generating a second updated AI model based on a second current AI model from a previous iteration and updating the second current AI model with the second updated AI model;
(v) determining whether to accept the second updated AI model;
(vi) upon determining to accept the second updated AI model, determining an optimal AI model;
(vii) repeating (iv)-(vi) for a number of iterations; and
(viii) upon completion of the number of iterations, outputting the optimal AI model as a second AI model; and
determine an optimal AI model based at least on the respective first AI models from the plurality of AI chips or based at least on the respective second AI models from the plurality of AI chips.

2. The system of claim 1, wherein the processing device is configured to output the optimal AI model by loading one or more parameters of the optimal AI model into an embedded cellular neural network architecture of an AI integrated circuit, the AI integrated circuit is coupled to a sensor and configured to:
receive data captured from the sensor; and
perform an AI task based on the captured data and the optimal AI model in the embedded cellular neural network architecture.

3. The system of claim 1, wherein:
the respective first AI model from a first AI chip of the plurality of AI chips is obtained based at least on the respective first AI models from other AI chips of the plurality of AI chips; and
the respective second AI model from a second AI chip of the plurality of AI chips is obtained based at least on the respective second AI models from other AI chips of the plurality of AI chips.

4. The system of claim 3, wherein each of the plurality of AI chips is configured to obtain respective training data, wherein the respective training data in the plurality of AI chips are non-overlapping subsets of a training dataset.

5. The system of claim 1, wherein the processing device is further configured to validate the optimal AI model.

6. The system of claim 4, wherein:
the first AI chip of the plurality of AI chips is configured to determine whether to accept the first updated AI model based at least on the respective first AI models of other AI chips of the plurality of AI chips; and
the second AI chip of the plurality of AI chips is configured to determine whether to accept the second updated AI model based at least on the respective second AI models of other AI chips of the plurality of AI chips.

7. The system of claim 6, wherein:
the first AI chip is further configured to determine whether to accept the first updated AI model based at least on a performance value of the first updated AI model, wherein the performance value of the first updated AI model is generated by an embedded cellular neural network (CeNN) in the first AI chip using the first updated AI model and the respective training data for the first AI chip.

8. The system of claim 7, wherein:
the first AI chip is further configured to determine whether to accept the first updated AI model based at least on a performance value of the first current AI model, wherein the performance value of the first current AI model is generated by the embedded CeNN in the first AI chip using the first current AI model and the respective training data for the first AI chip.

9. The system of claim 4, wherein the processing device is further configured to provide training configuration parameters to the plurality of AI chips before receiving the respective second AI models from the plurality of AI chips, and wherein each of the plurality of AI chips is configured to generate the second updated AI model based at least on the training configuration parameters.

10. The system of claim 1 further comprising providing initial AI models to the plurality of AI chips based on the respective first AI models before receiving the respective second AI models from the plurality of AI chips.

11. The system of claim 1, wherein the processing device is further configured to:
repeat receiving the respective first AI models before receiving the respective second AI models; or
repeat receiving the respective second AI models before receiving the respective first AI models.

12. The system of claim 1, wherein the processing device is further configured to:
repeat receiving the respective first AI models and repeating receiving the respective second AI models alternately in a plurality of iterations.

13. A method comprising:
at each of a plurality of artificial intelligence (AI) chips, performing a first search by:
(i) generating a first updated AI model based at least on a first current AI model in an previous iteration;
(ii) determining whether to accept the first updated AI model; and
(iii) upon determining to accept the first updated AI model, outputting the first updated AI model as a first AI model; otherwise, updating the first current AI model with the first updated AI model and repeating steps (i)-(iii);
at each of the plurality of AI chips, performing a second search by:
(iv) generating a second updated AI model based on a second current AI model from a previous iteration and updating the second current AI model with the second updated AI model;
(v) determining whether to accept the second updated AI model;
(vi) upon determining to accept the second updated AI model, determining an optimal AI model;
(vii) repeating (iv)-(vi) for a number of iterations; and
(viii) upon completion of the number of iterations, outputting the optimal AI model as a second AI model;
receiving the respective first AI models from the plurality of AI chips;
receiving the respective second AI models from the plurality of AI chips; and determining an optimal AI model based at least on the respective first AI models from the plurality of AI chips or based at least on the respective second AI models from the plurality of AI chips.

14. The method of claim 13 further comprising outputting the optimal AI model by loading one or more parameters of the optimal AI model into an embedded cellular neural network architecture of an AI integrated circuit, the AI integrated circuit is coupled to a sensor and configured to:
receive data captured from the sensor; and
perform an AI task based on the captured data and the optimal AI model in the embedded cellular neural network architecture.

15. The method of claim 13, wherein:
the respective first AI model from a first AI chip of the plurality of AI chips is obtained based at least on the respective first AI models from other AI chips of the plurality of AI chips; and
the respective second AI model from a second AI chip of the plurality of AI chips is obtained based at least on the respective second AI models from other AI chips of the plurality of AI chips.

16. The method of claim 15 further comprising obtaining respective training data for each of the plurality of AI chips, wherein the respective training data in the plurality of AI chips are non-overlapping subsets of a training dataset.

17. The method of claim 13 further comprising validating the optimal AI model.

18. The method of claim 16, wherein:
determining whether to accept the first updated AI model at the first AI chip of the plurality of AI chips is based at least on the respective first AI models of other AI chips of the plurality of AI chips; and
determining whether to accept the second updated AI model at the second AI chip of the plurality of AI chips is based at least on the respective second AI models of other AI chips of the plurality of AI chips.

19. The method of claim 18, wherein:
determining whether to accept the first updated AI model at the first AI chip of the plurality of AI chips is based at least on a performance value of the first updated AI model, wherein the performance value of the first updated AI model is generated by an embedded cellular neural network (CeNN) in the first AI chip using the first updated AI model and the respective training data for the first AI chip.

20. The method of claim 19, wherein:
determining whether to accept the first updated AI model at the first AI chip of the plurality of AI chips is based at least on a performance value of the first current AI model, wherein the performance value of the first current AI model is generated by the embedded CeNN in the first AI chip using the first current AI model and the respective training data for the AI chip.

21. The method of claim 16 further comprising providing training configuration parameters to the plurality of AI chips before receiving the respective second AI models from the plurality of AI chips, wherein generating the second updated AI model at each of the plurality of AI chips is based at least on the training configuration parameters.

22. The method of claim 13 further comprising providing initial AI models to the plurality of AI chips based on the respective first AI models before receiving the respective second AI models from the plurality of AI chips.

23. The method of claim 13 further comprising:
repeating receiving the respective first AI models before receiving the respective second AI models; or
repeating receiving the respective second AI models before receiving the respective first AI models.

24. The method of claim 13 further comprising repeating receiving the respective first AI models and repeating receiving the respective second AI models alternately in a plurality of iterations.

* * * * *